(12) United States Patent
Sloane et al.

(10) Patent No.: US 11,023,812 B2
(45) Date of Patent: Jun. 1, 2021

(54) EVENT PREDICTION AND IMPACT MITIGATION SYSTEM

(71) Applicant: Bank of America Corporation, Charlotte, NC (US)

(72) Inventors: Brandon Sloane, Santa Barbara, CA (US); John Brian Costello, Long Beach, CA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 930 days.

(21) Appl. No.: 15/688,267

(22) Filed: Aug. 28, 2017

(65) Prior Publication Data
US 2019/0065967 A1  Feb. 28, 2019

(51) Int. Cl.
*G06N 5/04* (2006.01)
*G06F 3/0482* (2013.01)

(52) U.S. Cl.
CPC ............ *G06N 5/04* (2013.01); *G06F 3/0482* (2013.01)

(58) Field of Classification Search
None
See application file for complete search history.

(56) References Cited

U.S. PATENT DOCUMENTS

| | | |
|---|---|---|
| 7,415,728 B2 | 8/2008 | Morohashi et al. |
| 7,552,480 B1 | 6/2009 | Voss |
| 7,681,234 B2 | 3/2010 | Florencio et al. |
| 7,865,952 B1 | 1/2011 | Hopwood et al. |
| 8,121,892 B2 | 2/2012 | Baggett, Jr. et al. |
| 8,170,841 B2 | 5/2012 | Pinto et al. |
| 8,196,207 B2 | 6/2012 | Hill et al. |
| 8,201,257 B1 | 6/2012 | Andres et al. |
| 8,225,371 B2 | 7/2012 | Jones et al. |
| 8,256,004 B1 | 8/2012 | Hill et al. |
| 8,260,653 B1 | 9/2012 | Osterfelt et al. |
| 8,478,788 B1 | 7/2013 | Frazier et al. |
| 8,495,367 B2 | 7/2013 | Ben-Natan |
| 8,495,747 B1 | 7/2013 | Nakawatase et al. |
| 8,549,649 B2 | 10/2013 | Golomb et al. |

(Continued)

OTHER PUBLICATIONS http://iwar.org.uk/comsec/resources/iso-27001/measuring-effectiveness.pdf—retrieved on Jan. 22, 2018.

(Continued)

*Primary Examiner* — Daniel C Puentes
(74) *Attorney, Agent, or Firm* — Michael A. Springs; Moore & Van Allen PLLC; Nicholas C. Russell

(57) ABSTRACT

Embodiments of the present invention provide a system for predicting one or more events and mitigating the impact of the one or more events. The system is typically configured for presenting a list of exposures to a user via an event prediction application user interface, prompting the user to select an exposure from the list of exposures, receiving a selection of the exposure and at least one option from the user device, determining type of the exposure based on the at least one option, determining one or more distribution models based on the type of the exposure, estimating occurrence of the one or more events associated with the exposure using at least one distribution model from the one or more distribution models, and in response to estimating the occurrence of the one or more events, triggering one or more automated counter measures.

20 Claims, 4 Drawing Sheets

(56) References Cited

U.S. PATENT DOCUMENTS

| | | | |
|---|---|---|---|
| 8,594,982 | B2 | 11/2013 | Mott et al. |
| 8,595,845 | B2 | 11/2013 | Basavapatna et al. |
| 8,744,894 | B2 | 6/2014 | Christiansen et al. |
| 8,782,784 | B1 | 7/2014 | Bruskin |
| 8,813,176 | B2 | 8/2014 | Jones et al. |
| 8,831,677 | B2 | 9/2014 | Villa-Real |
| 8,918,867 | B1 | 12/2014 | Salour |
| 9,098,513 | B1 | 8/2015 | Ren et al. |
| 9,130,983 | B2 | 9/2015 | Heo et al. |
| 9,571,517 | B2 | 2/2017 | Vallone et al. |
| 9,628,501 | B2 | 4/2017 | Ray et al. |
| 9,804,752 | B1 * | 10/2017 | Mall .................. H04L 67/22 |
| 10,187,408 | B1 | 1/2019 | Call et al. |
| 10,410,142 | B1 | 9/2019 | Hess et al. |
| 10,565,329 | B2 | 2/2020 | Greenwood |
| 10,928,567 | B2 | 2/2021 | Watanabe et al. |
| 2004/0205709 | A1 | 10/2004 | Hiltgen et al. |
| 2006/0224486 | A1 | 10/2006 | Krull et al. |
| 2006/0265630 | A1 | 11/2006 | Alberti et al. |
| 2006/0294430 | A1 | 12/2006 | Bunker et al. |
| 2007/0067678 | A1 | 3/2007 | Hosek et al. |
| 2008/0263534 | A1 | 10/2008 | Hirsave et al. |
| 2008/0295114 | A1 | 11/2008 | Argade et al. |
| 2011/0154498 | A1 | 6/2011 | Fissel et al. |
| 2011/0178836 | A1 * | 7/2011 | Seefeld ............. G06Q 10/0635 705/7.28 |
| 2012/0004946 | A1 | 1/2012 | Blackwood et al. |
| 2012/0030312 | A1 | 2/2012 | Lehr et al. |
| 2012/0304277 | A1 | 11/2012 | Li et al. |
| 2013/0276053 | A1 | 10/2013 | Hugard et al. |
| 2015/0066577 | A1 | 3/2015 | Christiansen et al. |
| 2015/0163242 | A1 | 6/2015 | Laidlaw et al. |
| 2015/0178063 | A1 | 6/2015 | Narkinsky et al. |
| 2015/0227868 | A1 | 8/2015 | Saraf et al. |
| 2016/0050181 | A1 | 2/2016 | Halpern et al. |
| 2016/0117211 | A1 | 4/2016 | Makuch et al. |
| 2016/0180090 | A1 | 6/2016 | Dalcher et al. |
| 2016/0255113 | A1 | 9/2016 | Efstathopoulos |
| 2018/0081330 | A1 | 3/2018 | Haslett et al. |
| 2018/0212997 | A1 | 7/2018 | Ahuja et al. |

OTHER PUBLICATIONS http://eval.symantec.com/mktginfo/downloads/21187913_GA_WP_SecuringtheCloudfortheEnterprise_05%2011.pdf—retrieved on Jan. 22, 2018.

http://media.kaspersky.com/en/business-security/growth-and-complexity-of-information-security.pdf—retrieved on Jan. 22, 2018.

https://statetechmagazine.com/sites/default/files/continuous_monitoring_of_information_security.pdf—retrieved on Jan. 22, 2018.

Kevin Dowd, "An introduction to market risk measurement", ISBN 0470847484, 2002.

Earl Follis, "Read this roundup before investing in a patch management tool", found at https://web.archive.org/web/20170629161626/https://searchsecurity.techtarget.corn/feature/Read-this-roundup-before-investing in a patch management-tool, Jun. 2017 (Year: 2017).

* cited by examiner

EVENT PREDICTION AND IMPACT MITIGATION SYSTEM

FIELD

The present invention relates to event prediction and mitigating the impact of the predicted one or more events.

BACKGROUND

Present conventional systems predict one or more events by using rudimentary modeling techniques based on the quantitative analysis of past events. That said, there are a number of technical problems with using the conventional systems to predict one or more events. As such, there exists a need for an improved way of predicting one or more events and mitigating the impact of the predicted one or more events.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for predicting occurrence of one or more events and mitigating the impact of the one or more events. The system embodiments may comprise one or more memory devices having computer readable program code stored thereon, a communication device, and one or more processing devices operatively coupled to the one or more memory devices, wherein the one or more processing devices are configured to present a list of exposures to a user, via an event prediction application user interface on a user device, prompt the user to select an exposure from the list of exposures, via the event prediction application user interface, receive a selection of the exposure from the user device, via the event prediction application user interface, receive at least one option from the user device, via the event prediction application user interface, determine type of the exposure based on the at least one option, determine one or more distribution models based on the type of the exposure, wherein the one or more distribution models estimate occurrence of one or more events associated with the exposure, prompt the user to select at least one distribution model from the one or more distribution models via the event prediction application user interface, receive a second selection of the at least one distribution model from the user, and in response to receiving the second selection of the at least one distribution model from the user, estimate occurrence of the one or more events associated with the exposure using the at least one distribution model.

In some embodiments, estimating the occurrence of the one or more events associated with the exposure using the at least one distribution model further comprises triggering one or more automated counter measures.

In some embodiments, determining the one or more distribution models further comprises extracting historical data associated with the exposure from a historical database, applying the historical data to the one or more distribution models, calculating accuracy of the one or more distribution models based on applying the historical data to the one or more distribution models, and presenting the accuracy of the one or more distribution models via the event prediction application user interface.

In some embodiments, presenting the accuracy of the one or more distribution models further comprises recommending a suitable distribution model from the one or more distribution models based on the accuracy of the one or more distribution models.

In some embodiments, the second selection of the at least one distribution model received from the user is same as the suitable distribution model.

In some embodiments, estimating the occurrence of the one or more events associated with the exposure using the at least one distribution model comprises applying current data to the at least one distribution model.

In some embodiments, the one or more processing devices are configured to in response to receiving the selection of the exposure, generate a questionnaire associated with the exposure, wherein the questionnaire comprises one or more guiding questions, wherein each of the one or more guiding questions comprises one or more options, display the questionnaire via the event prediction application user interface, prompt the user to select the at least one option from the one or more options.

In some embodiment, the questionnaire is generated by extracting information associated with the exposure from a data store, wherein the information comprises at least industry specific knowledge and security knowledge, and formulating the one or more guiding questions based on the extracted information, wherein the one or more guiding questions are used to determine the type of the exposure.

In some embodiments, the one or more processing devices are further configured to collect new data at a future time period, compare the new data with estimated data associated with the occurrence of the one or more events, calculate new accuracy of the at least one distribution model based on comparing the new data with the estimated data, and display the new accuracy to the user via the event prediction application user interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
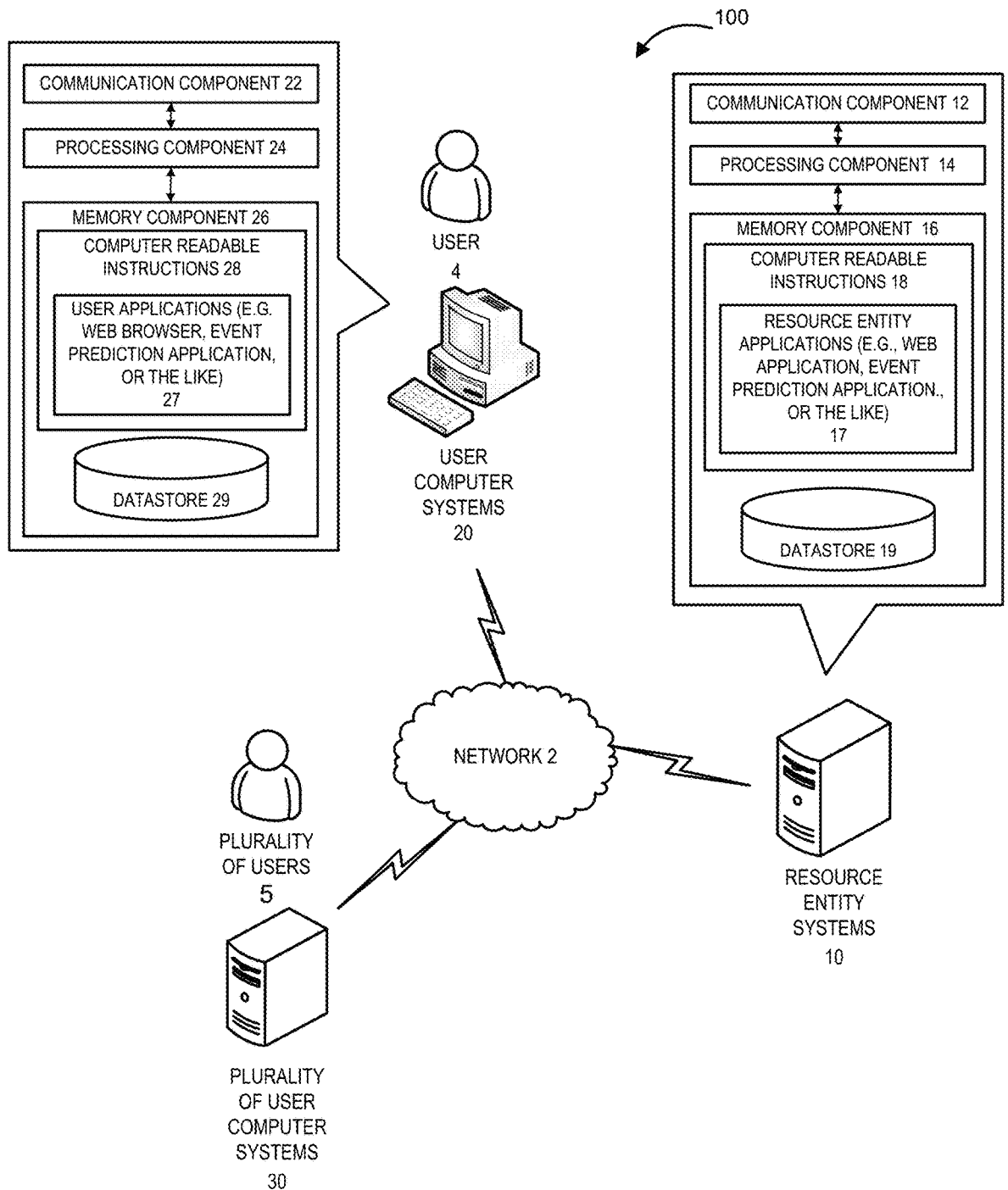

Having thus described embodiments of the invention in general terms, reference will now be made to the accompanying drawings, where:

FIG. 1 illustrates a block diagram illustrating the event prediction and mitigation system environment, in accordance with embodiments of the present invention.

Figure 2A:
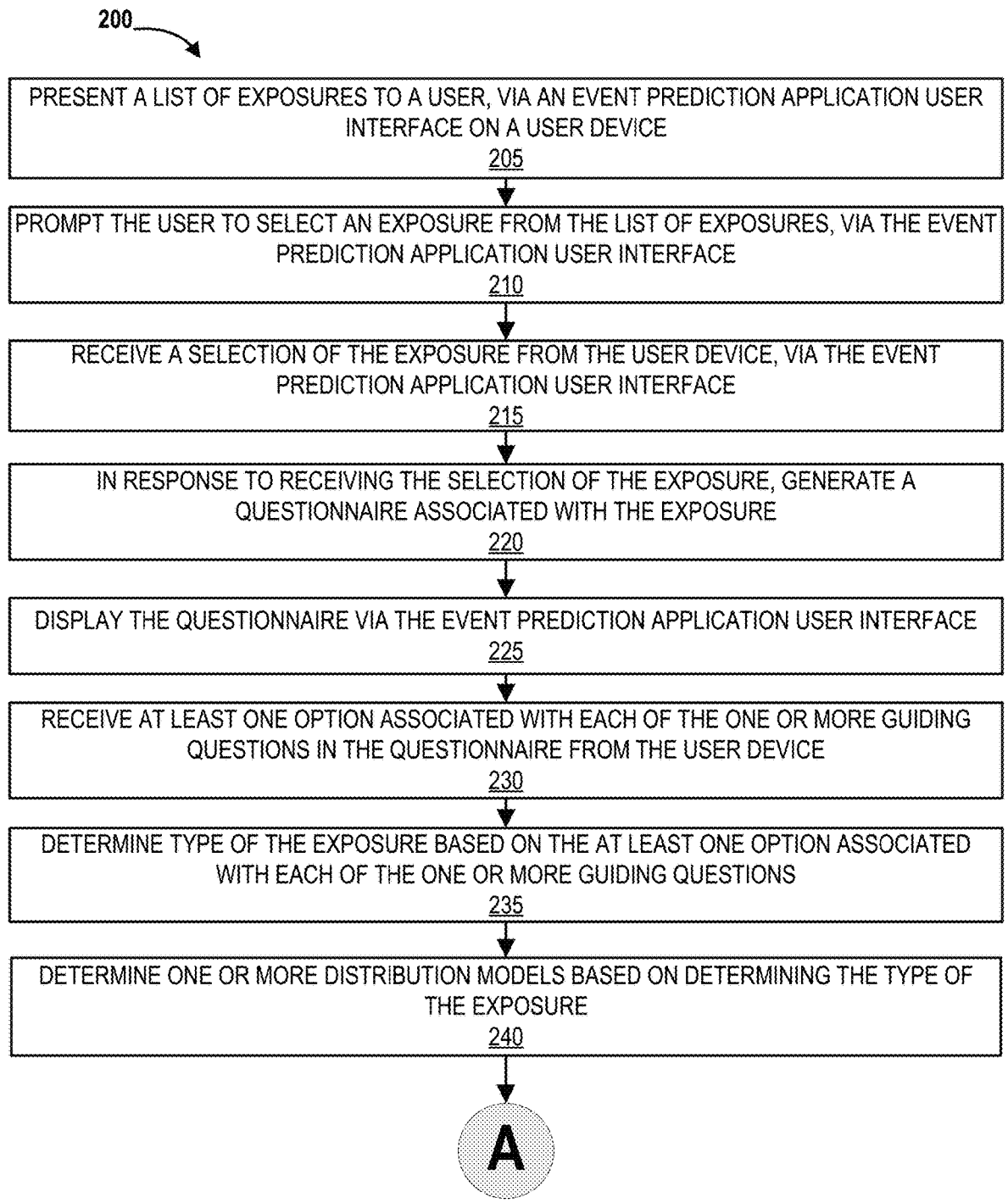

FIG. 2A is a flowchart illustrating a general process flow for predicting the occurrence of events associated with exposures and mitigating the impact of the events, in accordance with embodiments of the present invention.

Figure 2B:
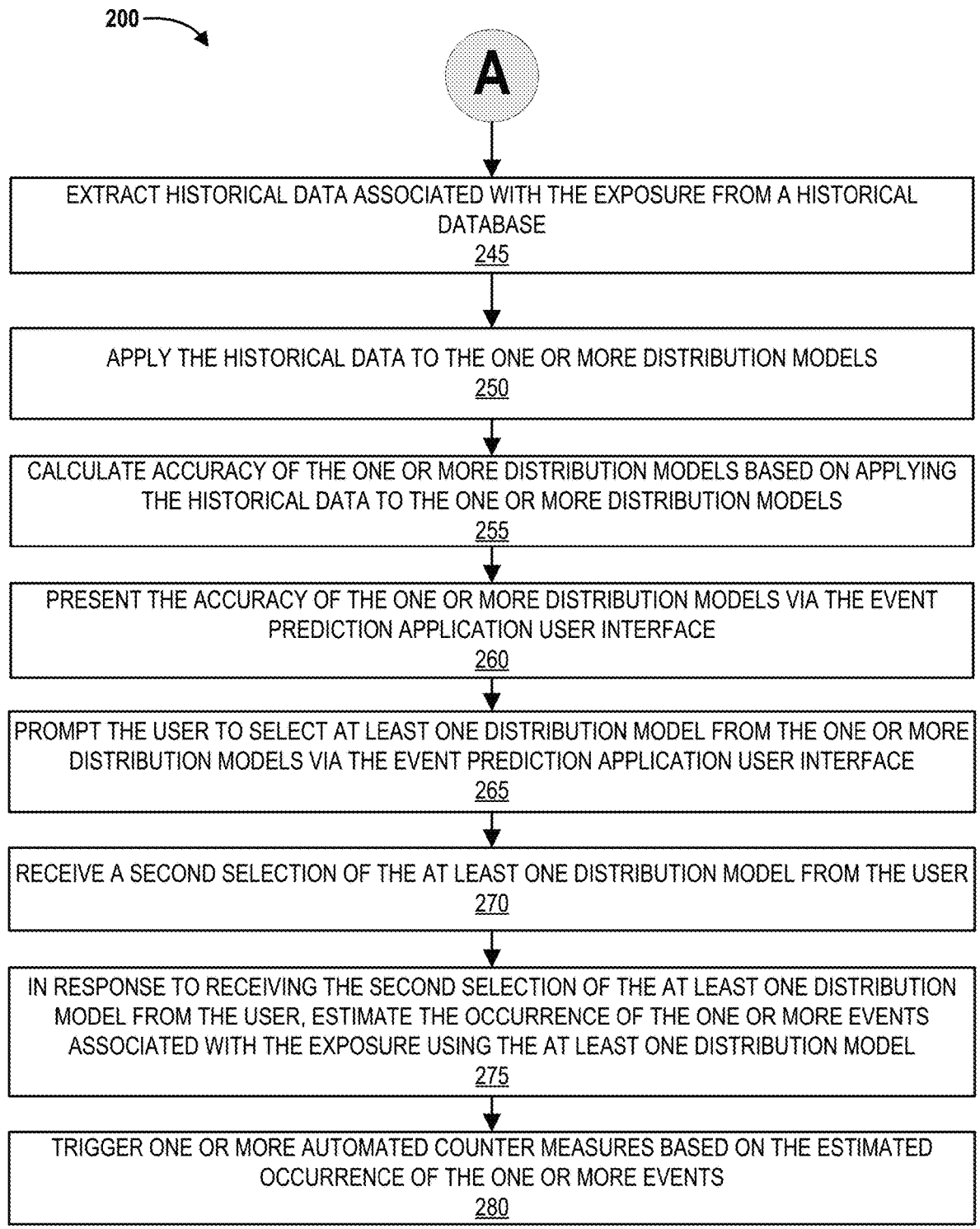

FIG. 2B is a flowchart illustrating a continuation of the general process flow for predicting the occurrence of events associated with exposures and mitigating the impact of the events, in accordance with embodiments of the present invention.

Figure 3:
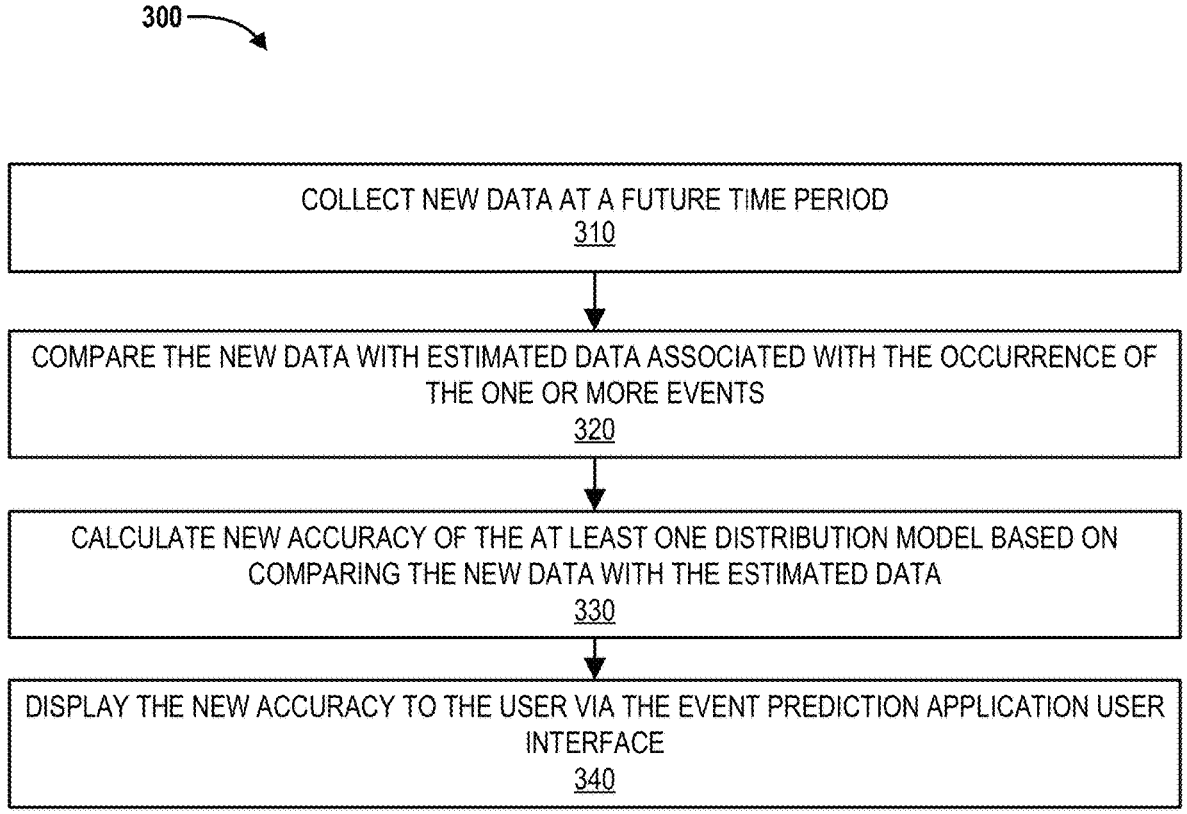

FIG. 3 is a flowchart illustrating a general process flow for verifying accuracy of a distribution model selected by the user at a future time period, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for estimating the occurrence of one or more events associated with the exposures. Typically, conventional systems use distribution models that are rudimentary to perform exposure analysis and predict the one or more events. The rudimentary distribution models utilized by the systems may be normal Gaussian distribution models that rely on quantitative analysis of historical data to predict the one or more events. For example, the conventional systems may determine that certain types of events are occurring frequently and may give highest priority to the frequently occurring events neglecting the impact of the non-frequently occurring events. Events which occur less frequently may have highest impact on the system. Assigning highest priority to the low impact events may cause the systems to take corrective measures and allocate resources to the low impact events, thereby neglecting the high impact events. The high impact events may disrupt the entire system and also degrade the performance of the systems. The present invention solves the problem by performing exposure analysis to determine type of exposure and suggest one or more distribution models such as extreme loss models suitable for the exposure based on the type of the exposure, thereby increasing processing efficiency of the systems and also allowing proper allocation of resources to mitigate the effects of the high impact events.

The present system provides an event prediction application user interface on a user computer system using which the system receives input associated with the exposure analysis from the user. The system may initially allow a user to select an exposure from a list of exposures presented on the event prediction application user interface and upon receiving the user election, the system may formulate one or more guiding questions to analyze the impact of events associated with the exposure selected by the user. Based on the answers received from the user to each of the one or more guiding questions, the system may determine one or more distribution models suitable to the exposure selected by the user. The system also calculates accuracies of each of the distribution models and may suggest a most suitable distribution model to the user based on the calculated accuracies. After presenting the one or more distribution models, the calculated accuracies, and the most suitable distribution model, the system may prompt the user to select a distribution model from the one or more distribution models. Once the system receives a selection of the distribution model from the user, the system may predict one or more future events associated with the exposure using the distribution model and may also perform one or more automated counter measures to mitigate the impact of the predicted one or more future events. Therefore, instead of relying solely on the quantitative analysis of the past event data, the system analyzes the impact of events associated with the exposure and determines based on the impact analysis, the most suitable distribution models to predict future events. The system also implements automated counter measures to mitigate high impact future events, thereby preventing improper usage of resources and improving the processing efficiency of the system.

In accordance with embodiments of the invention, the terms "resource entity system" may include any organization that processes financial transactions including, but not limited to, banks, credit unions, savings and loan associations, card associations, settlement associations, investment companies, stock brokerages, resource management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates an event prediction and impact mitigation system environment 100, in accordance with embodiments of the invention. As illustrated in FIG. 1, one or more resource entity systems 10 are operatively coupled, via a network 2, to user computer systems 20, a plurality of user computer systems, and/or one or more other systems (not illustrated). In this way, the user 4 (e.g., one or more associates, employees, agents, contractors, sub-contractors, third-party representatives, customers, or the like), through a user application 27 (e.g., web browser, dedicated or event prediction application, or the like), may access resource entity applications 17 (e.g., web site, event prediction application, or the like) of the resource entity systems 10 to perform exposure analysis. In some embodiments, the event prediction application may be a part of an independent event prediction and impact mitigation system. In such an embodiment, the independent event prediction and impact mitigation system is maintained and operated by the resource entity systems 10. The independent event prediction and impact mitigation system may comprise one or more processing devices operatively coupled to the one or more memory devices and configured to execute computer readable code stored in the one or more memory devices.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interaction entity systems 30, third-party systems 40, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like. In one embodiment of the present invention, the one or more processing components 14 automatically implement one or more automated counter measures to mitigate impact of the one or more exposures.

As further illustrated in FIG. 1, the resource entity systems 10 comprise computer-readable instructions 18 stored in the memory component 16, which in one embodiment includes the computer-readable instructions 18 of the resource entity application 17 (e.g., website application, event prediction application, or the like). In some embodiments, the one or more memory components 16 include one or more data stores 19 for storing data related to the resource entity systems 10, including, but not limited to, data created, accessed, and/or used by the resource entity application 17. The one or more data stores store historical data, information such as information security knowledge, industry specific knowledge associated with one or more exposures. In some embodiments, information associated with the one or more exposures is gathered by the resource entity applications 17 by communicating with other resource entity systems or third party entity systems (not shown). In one embodiment of the present invention, the event prediction application comprises an analytics engine to perform one or more steps described in the process flows 200 and 300.

As illustrated in FIG. 1, users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4. In one embodiment of the present invention, the event prediction application in the user computer systems 20 and the plurality of user computer systems 30 may comprises a special event prediction interface to display information associated with the one or more exposures to the user and receive information associated with the one or more exposures from the user.

As illustrated in FIG. 1, the user computer systems 20 may have computer-readable instructions 28 stored in the one or more memory components 26, which in one embodiment includes the computer-readable instructions 28 for user applications 27, such as event prediction application (e.g., apps, applet, or the like), portions of event prediction application, a web browser or other apps that allow the user 4 to take various actions, including allowing the user 4 to access applications located on other systems, or the like. In some embodiments, the user 4 utilizes the user applications 27, through the user computer systems 20, to access the resource entity applications 17 to perform exposure analysis. Moreover, in some embodiments the user 4 may also utilize the user applications 27 to implement one or more corrective measures to mitigate the impact of the one or more exposures. The plurality of user computer systems 30 associated with a plurality of users 5 may include similar structure as that of the user computer systems 20.

Referring now to FIG. 2, a general process flow 200 is provided for predicting one or more events associated with one or more exposures, in accordance with embodiments of the present invention. As shown in block 205, the system presents a list of exposures to a user, via an event prediction application user interface on a user device. The list of exposures may be organization specific, industry specific, and/or the like. There may be 'n' number of exposures in the list of exposures and the list of exposures is not definite. In some embodiments, the user may identify a new exposure and may add the new exposure to the existing list of exposures. In some exemplary embodiments, the list of exposures may include data loss, technology failure, and/or the like. In some embodiments, the list of exposures may be operational exposures. In some embodiments, the list of exposures may be identified and provided by the resource entity systems 10. In some embodiments, the list of exposures may be identified by the system based on past events. For example, the system may identify that a loss of customer data has impacted the resource entity system in the past and may identify data loss as an exposure. In some embodiments, each of the exposures in the list may have subcategories of exposures. For example, data loss may include customer data loss, financial data loss, and/or the like. In some embodiments, the list of exposures may be based on resources under protection, threat factors, and/or threat vectors. The event prediction application user interface is an interface provided by the event prediction application on the user computer systems.

As shown in block 210, the system prompts the user to select an exposure from the list of exposures, via the event prediction application user interface. For example, the user may want to perform exposure analysis and event prediction associated with data loss. The system may prompt the user to select one exposure from the list of exposures that the user wishes to perform exposure analysis on. Exposure analysis includes analyzing impact and likelihood of events associated with data loss.

As shown in block 215, the system receives a selection of the exposure from the user device, via the event prediction application user interface. For example, the user may select data loss from the list of exposures and may submit the selection of data loss to the system via the event prediction application user interface. In some embodiments, the user may select more than one exposures from the list of exposures presented by the system via the user interface. In some embodiments, the user may select a single exposure and one or more sub categories of the single exposure. For example, the user may select data loss and only customer data loss from the sub-categories associated with the data loss.

As shown in block 220, the system in response to receiving the selection of the exposure, generates a questionnaire associated with the exposure. The questionnaire may include one or more guiding questions that determine type of the exposure and each of the one or more guiding questions may comprise one or more options. For example, if the user has selected data loss from the list of exposures, the system generates a questionnaire associated with the data loss to determine the impact and likelihood of occurrence of events linked with data loss. In some embodiments, the system extracts industry specific knowledge from the one or more data stores to formulate the one or more guiding questions. For example, the system may extract information associated with the number of regulatory agencies involved with the data associated with the exposure and formulates guiding questions such as "There are five regulatory agencies involved with the data, what would be the impact of losing this data?" and may provide one or more options such as "extreme," "moderate," "low," and/or the like. In some embodiments, the system extracts information security knowledge from a data store to formulate the one or more guiding questions. For example, the system extracts information associated with the type of data, number of existing controls to regulate the flow of data, and the number of customers associated with the data and formulates guiding questions such as "The data is associated with personal information of the customers, what would be the impact of losing this data?" or "The data is associated with five thousand customers and there are five controls in place to regulate the flow of the data, what is the likelihood of data loss?" and may also provide one or more options such as "extreme," "moderate," "low," and/or the like.

In some embodiments, the one or more guiding questions are based on historical data. In an exemplary embodiment, the system may identify that one or more past events associated with the exposure selected by the user and may formulate guiding questions such as "There are 'n' number of past events associated with the exposure, what is the likelihood of occurrence of such events in the future?" The system may also present more than option to the user. Alternatively, the system may directly input the answer into a text box provided by the system. In some embodiments, after receiving the selection of exposure 'A' from the user, the system may determine that no historical data associated with the exposure is available in the one or more data stores of the system. In such an embodiment, the system may identify one or more exposures similar to exposure 'A' and may formulate a guiding question such as "Identify one or more exposures similar to the exposure 'A' from the list below." The system may present the guiding question and a list of the one or more exposures to the user. Upon receiving a selection of at least one exposure from the list of one or more exposures from the user, the system may extract data associated with the at least one exposure and may formulate additional guiding questions to determine the impact of events associated with exposure 'A.'

As shown in block 225, the system displays the questionnaire via the event prediction application user interface. For example, the system may present the one or more guiding questions in the form a prompt via the event prediction application user interface. As shown in block 230, the system receives at least one option associated with each of the one or more guiding questions in the questionnaire from the user device. For example, when the system displays one of the guiding questions such as "The data is associated with personal information of the customers, what would be the impact of losing this data?" and presents one or more options such as "extreme," "moderate," "low," and/or the like, the user may select the option "extreme" and send it to the system. In some embodiments, the system may receive more than one options from the user. In alternate embodiments, the system may receive exactly one option from the user.

As shown in block 235, the system determines type of the exposure based on the at least one option associated with each of the one or more guiding questions in the questionnaire received from the user. The type of exposure may be defined based on the level of severity of the impact of one or more events associated with the exposure. For example, if the exposure selected by the user is data loss and if the data loss has a high impact and may affect the system or the entity severely, the type of the exposure i.e., data loss may be identified as "priority 1". Based on the level of severity, the type of the exposures may be identified as "priority 1," "priority 2," and/or the like.

As shown in block 240, the system determines one or more distribution models based on determining the type of the exposure. The one or more distribution models may be any distribution models used in probability theory and statistics. In some embodiments, the one or more distribution models may be extreme loss models such as Gumbel distribution model, Frechet Distribution model, and/or the like. In one exemplary embodiment, when the exposure selected by the user is data loss and the type of exposure is "priority 1," the system determines that the Gumbel distribution model and Frechet distribution model are suitable for the exposure with "priority 1."

As shown in block 245, the system extracts historical data associated with the exposure from a historical database. The historical database may be part of the one or more data stores. Historical data may be any data associated with the exposures. For example, the historical data may be any data from a previous year. In some embodiments, historical data may be any data associated with the past events. In some embodiments, the historical data may be data generated by other resource entity systems. In some embodiments, the historical data may be financial data associated with the exposure. In an exemplary embodiment, wherein the exposure is data loss, the historical data may be related to the flow of data. As shown in block 250, the system applies historical data to the one or more distribution models. In an exemplary embodiment, the system applies one month data from the previous year to the one or more distribution models and determines accuracy of the distribution models. For example, the system may apply March data from the previous year to predict the one or more events for the month of April. The system may then compare the predicted data for the month of April with the already existing April month data from the previous year to calculate accuracy of the one or more distribution models and check how well the one or more distribution models may have predicted the one or more past events had the system been using the one or more distribution models. In some embodiments, the system may calculate the accuracy of the one or more distribution models by utilizing twelve month data from the previous year. In some other embodiments, the system may calculate the accuracy of the one or more distribution models by utilizing more or less than twelve month data from any of the previous years.

As shown in block 255, the system calculates accuracy of the one or more distribution models based on applying the historical data to the one or more distribution models. For example, the system may determine that the Gumbel distribution model has predicted events associated with data loss ninety percent accurately and that the Frechet distribution model has predicted events associated with data loss ninety-nine percent accurately based on applying previous year data to the one or more distribution models. As shown in block 260, the system presents the accuracy of the one or more distribution models via the event prediction application user interface. In an exemplary embodiment, the system may recommend a suitable distribution model from the one or more distribution models based on the accuracy of the one or more distribution models. For example, the system may recommend Frechet distribution model as the most suitable distribution model for the exposure as it may have predicted past events associated with the data loss ninety-nine percent accurately had the system been using Frechet distribution model.

As shown in block 265, the system prompts the user to select at least one distribution model from the one or more distribution models via the event prediction application user interface. For example, the system may present accuracies of both the Frechet distribution model and the Gumbel distribution model and may display Frechet distribution model as the most suitable model. The system may then prompt the user to select any of the one or more distribution models. As shown in block 270, the system receives a second selection of the at least one distribution model from the user. In some embodiments, the at least one distribution model selected by the user is same as the most suitable model recommended by the system. In alternate embodiments, the at least one distribution model is different from the most suitable model recommended by the system. For example, the user may choose Gumbel distribution model instead of Frechet distribution model. In some embodiments, the exposure selected by the user in block 215 may be a subcategory. In other words, the exposure selected by the user may be downstream. In such an embodiment, the system may utilize the at least one distribution model selected by the user in conjunction with an upstream distribution model. For example, exposure 'A' selected by the user may be downstream to exposure 'X' which is already assessed by the system. The system may utilize the distribution model associated with exposure 'X' in conjunction with the distribution model associated with exposure 'A' to assess exposure 'A.' Alternatively, the system may utilize the output of assessment of exposure 'X' to assess exposure 'A.' In another alternate embodiment, assessment of exposure 'A' may be a subprocess in assessment of exposure 'X.'

As shown in block 275, the system in response to receiving the second selection of the at least one distribution model from the user, estimates the occurrence of the one or more events associated with the exposure using the at least one distribution model. The system estimates the occurrence of the one or more events by applying the most recent data to the at least one distribution model selected by the user. For example, the system may extract previous month data from the one or more data stores and may provide the extracted data as input to the at least one distribution model. The at least one distribution model may estimate that data loss may occur once next month based on the inputted data. In some embodiments, the system may generate one or more reports to document the estimated data, the at least one distribution model used in generating the estimated data, and/or the like.

As shown in block 280, the system triggers one or more automated counter measures based on the estimated occurrence of the one or more events. The one or more automated counter measures may be any steps performed by the system to mitigate the impact of the predicted events. In an exemplary embodiment, the automated counter measure may be purchasing insurance to reduce the impact caused by data loss. In some embodiments, the system may perform one or more steps to prevent the event from happening. For example, the system may implement automated counter measure by placing more controls on the flow of data to prevent the event from happening. In some embodiments, the system may require user approval before automatically implementing the one or more automated counter measures.

In some embodiments, the system may trigger actions to automatically allocate resources to mitigate the impact of the events associated with the exposures. Resources may be any one of funds, software, people, and/or the like. In one embodiment, the system may assign a user to implement one or more steps to mitigate the impact of the event. In another embodiment, the system may allocate funds to mitigate the impact of the events. The present invention thereby predicts the occurrence of one or more events by performing exposure analysis to determine the type of exposure and suggesting one or more distribution models based on the type of the exposure rather than just relying on quantitative analysis of the past events. Therefore, the system may utilize the predicted data to improve the efficiency of the system by mitigating the impact of the one or more events.

Referring now to FIG. 3, a general process flow 300 is provided for verifying at a future time period, the accuracy of the at least one distribution model selected by the user. As shown in block 310, the system collects new data at a future time period. For example, if the system predicted data for the month of March at the beginning of the month, the system collects new data i.e., March month data at the end of the month. The new data may be event data associated with data loss exposure. As shown in block 320, the system compares the new data with estimated data associated with the occurrence of the one or more events.

As shown in block 330, the system calculates new accuracy of the at least one distribution model based on comparing the new data with the estimated data. For example, if the user has selected Gumbel distribution model for predicting events for the month of March, the system compares the March month data collected at the end of the month with the estimated data provided by the system using the Gumbel distribution model at the beginning of the month. In some embodiments, the system may input the new data into the at least one distribution model and may compare output with the estimated data.

As shown in block 340, the system displays the new accuracy to the user via the event prediction application user interface. For example, if the Gumbel distribution model predicted that the one event may occur in the month of March, the system determines the accuracy by verifying whether the event has occurred or not based on the comparison of the new data and the predicted data. If the event has occurred, the system determines that the Gumbel distribution model is hundred percent accurate and displays the accuracy to the user via the event prediction application user interface. In some embodiments, when the new accuracy is below a predetermined threshold, the system may automatically trigger one or more actions. For example, the system may determine one or more contacts associated with the exposure analysis and may send one or more alerts. Based on receiving the one or more alerts, the one or more contacts may take one or more measures. In some embodiments, when the new accuracy is below a predetermined threshold, the system may automatically suggest a new set of distribution models to the user and may prompt the user to repeat the exposure analysis. In some embodiments of the present invention, a feedback is given to the system based on the calculated new accuracy. The system may use this feedback to improve the suggestions of the one or more distribution models for different types of the exposure.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application:

| Docket Number | U.S. patent application Ser. No. | Title | Filed On |
| --- | --- | --- | --- |
| 7823US1.014033.3057 | To be assigned | INDICATOR REGRESSION AND MODELING FOR IMPLEMENTING SYSTEM CHANGES TO IMPROVE CONTROL EFFECTIVENESS | Concurrently herewith |

What is claimed is:

1. A system for predicting occurrence of one or more events and mitigating the impact of the one or more events, the system comprising:

one or more memory devices having computer readable code stored thereon; and one or more processing devices operatively coupled to the one or more memory devices, wherein the one or more processing devices are configured to execute the computer readable code to:

present a list of exposures to a user, via an event prediction application user interface on a user device;

prompt the user to select an exposure from the list of exposures, via the event prediction application user interface;

receive a selection of the exposure from the user device, via the event prediction application user interface;

receive at least one option from the user device, via the event prediction application user interface;

determine type of the exposure based on the at least one option;

determine one or more distribution models based on the type of the exposure, wherein the one or more distribution models estimate occurrence of one or more events associated with the exposure, wherein determining the one or more distribution models comprises:

extracting historical data associated with the exposure from a historical database;

applying the historical data to the one or more distribution models;

calculating accuracy of the one or more distribution models based on applying the historical data to the one or more distribution models;

presenting the accuracy of the one or more distribution models via the event prediction application user interface; and recommending a suitable distribution model from the one or more distribution models based on the accuracy of the one or more distribution models;

prompt the user to select at least one distribution model from the one or more distribution models via the event prediction application user interface;

receive a second selection of the at least one distribution model from the user; and in response to receiving the second selection of the at least one distribution model from the user, estimate occurrence of the one or more events associated with the exposure using the at least one distribution model.

2. The system of claim 1, wherein estimating the occurrence of the one or more events associated with the exposure using the at least one distribution model further comprises triggering one or more automated counter measures.

3. The system of claim 1, wherein the second selection of the at least one distribution model received from the user is same as the suitable distribution model.

4. The system of claim 1, wherein estimating the occurrence of the one or more events associated with the exposure using the at least one distribution model comprises applying current data to the at least one distribution model.

5. The system of claim 1, wherein the one or more processing devices are configured to:
  in response to receiving the selection of the exposure, generate a questionnaire associated with the exposure, wherein the questionnaire comprises one or more guiding questions, wherein each of the one or more guiding questions comprises one or more options;
  display the questionnaire via the event prediction application user interface; and
  prompt the user to select the at least one option from the one or more options.

6. The system of claim 5, wherein the one or more processing devices are configured to execute the computer readable code to generate the questionnaire by:
  extracting information associated with the exposure from a data store, wherein the information comprises at least industry specific knowledge and security knowledge; and
  formulating the one or more guiding questions based on the extracted information, wherein the one or more guiding questions are used to determine the type of the exposure.

7. The system of claim 1, wherein the one or more processing devices are configured to execute the computer readable code to:
  collect new data at a future time period;
  compare the new data with estimated data associated with the occurrence of the one or more events;
  calculate new accuracy of the at least one distribution model based on comparing the new data with the estimated data; and
  display the new accuracy to the user via the event prediction application user interface.

8. A computer program product for predicting occurrence of one or more events and mitigating the impact of the one or more events, the computer program product comprising at least one non-transitory computer readable medium comprising computer readable instructions for:
  presenting a list of exposures to a user, via an event prediction application user interface on a user device;
  prompting the user to select an exposure from the list of exposures, via the event prediction application user interface;
  receiving a selection of the exposure from the user device, via the event prediction application user interface;
  receiving at least one option from the user device, via the event prediction application user interface;
  determining type of the exposure based on the at least one option;
  determining one or more distribution models based on the type of the exposure, wherein the one or more distribution models estimate occurrence of one or more events associated with the exposure, wherein determining the one or more distribution models comprises:
    extracting historical data associated with the exposure from a historical database;
    applying the historical data to the one or more distribution models;
    calculating accuracy of the one or more distribution models based on applying the historical data to the one or more distribution models;
    presenting the accuracy of the one or more distribution models via the event prediction application user interface; and
    recommending a suitable distribution model from the one or more distribution models based on the accuracy of the one or more distribution models;
  prompting the user to select at least one distribution model from the one or more distribution models via the event prediction application user interface;
  receiving a second selection of the at least one distribution model from the user; and
  in response to receiving the second selection of the at least one distribution model from the user, estimating occurrence of the one or more events associated with the exposure using the at least one distribution model.

9. The computer program product of claim 8, wherein the computer readable instructions further comprise instructions for triggering one or more automated counter measures based on estimating the occurrence of the one or more events associated with the exposure.

10. The computer program product of claim 8, wherein the computer readable instructions further comprise instructions for:
  in response to receiving the selection of the exposure, generating a questionnaire associated with the exposure, wherein the questionnaire comprises one or more guiding questions, wherein each of the one or more guiding questions comprises one or more options;
  displaying the questionnaire via the event prediction application user interface; and
  prompting the user to select the at least one option from the one or more options.

11. The computer program product of claim 10, wherein the computer readable instructions for generating the questionnaire further comprise instructions for:
  extracting information associated with the exposure from a data store, wherein the information comprises at least industry specific knowledge and security knowledge; and
  formulating the one or more guiding questions based on the extracted information, wherein the one or more guiding questions are used to determine the type of the exposure.

12. The computer program product of claim 8, wherein the second selection of the at least one distribution model received from the user is same as the suitable distribution model.

13. The computer program product of claim 8, wherein estimating the occurrence of the one or more events associated with the exposure using the at least one distribution model comprises applying current data to the at least one distribution model.

14. The computer program product of claim 8, wherein the computer readable instructions further comprise instructions for:
  collecting new data at a future time period;
  comparing the new data with estimated data associated with the occurrence of the one or more events;

calculating new accuracy of the at least one distribution model based on comparing the new data with the estimated data; and displaying the new accuracy to the user via the event prediction application user interface.

15. A computer implemented method for predicting occurrence of one or more events and mitigating the impact of the one or more events, the computer implemented method comprising:

presenting a list of exposures to a user, via an event prediction application user interface on a user device;

prompting the user to select an exposure from the list of exposures, via the event prediction application user interface;

receiving a selection of the exposure from the user device, via the event prediction application user interface;

receiving at least one option from the user device, via the event prediction application user interface;

determining type of the exposure based on the at least one option;

determining one or more distribution models based on the type of the exposure, wherein the one or more distribution models estimate occurrence of one or more events associated with the exposure, wherein determining the one or more distribution models comprises:

extracting historical data associated with the exposure from a historical database;

applying the historical data to the one or more distribution models;

calculating accuracy of the one or more distribution models based on applying the historical data to the one or more distribution models;

presenting the accuracy of the one or more distribution models via the event prediction application user interface; and recommending a suitable distribution model from the one or more distribution models based on the accuracy of the one or more distribution models;

prompting the user to select at least one distribution model from the one or more distribution models via the event prediction application user interface;

receiving a second selection of the at least one distribution model from the user; and in response to receiving the second selection of the at least one distribution model from the user, estimating occurrence of the one or more events associated with the exposure using the at least one distribution model.

16. The computer implemented method of claim 15, wherein estimating the occurrence of the one or more events associated with the exposure further comprises triggering one or more automated counter measures.

17. The computer implemented method of claim 15, wherein the method further comprises:

in response to receiving the selection of the exposure, generating a questionnaire associated with the exposure, wherein the questionnaire comprises one or more guiding questions, wherein each of the one or more guiding questions comprises one or more options;

displaying the questionnaire via the event prediction application user interface; and prompting the user to select the at least one option from the one or more options.

18. The computer implemented method of claim 15, wherein the second selection of the at least one distribution model received from the user is same as the suitable distribution model.

19. The computer implemented method of claim 15, wherein estimating the occurrence of the one or more events associated with the exposure using the at least one distribution model comprises applying current data to the at least one distribution model.

20. The computer implemented method of claim 15, the method further comprises:

collecting new data at a future time period;

comparing the new data with estimated data associated with the occurrence of the one or more events;

calculating new accuracy of the at least one distribution model based on comparing the new data with the estimated data; and displaying the new accuracy to the user via the event prediction application user interface.

* * * * *